F. J. ORR.
SYSTEM AND APPARATUS FOR GENERATING AND BURNING OIL GAS.
APPLICATION FILED AUG. 5, 1909. RENEWED JUNE 30, 1911.

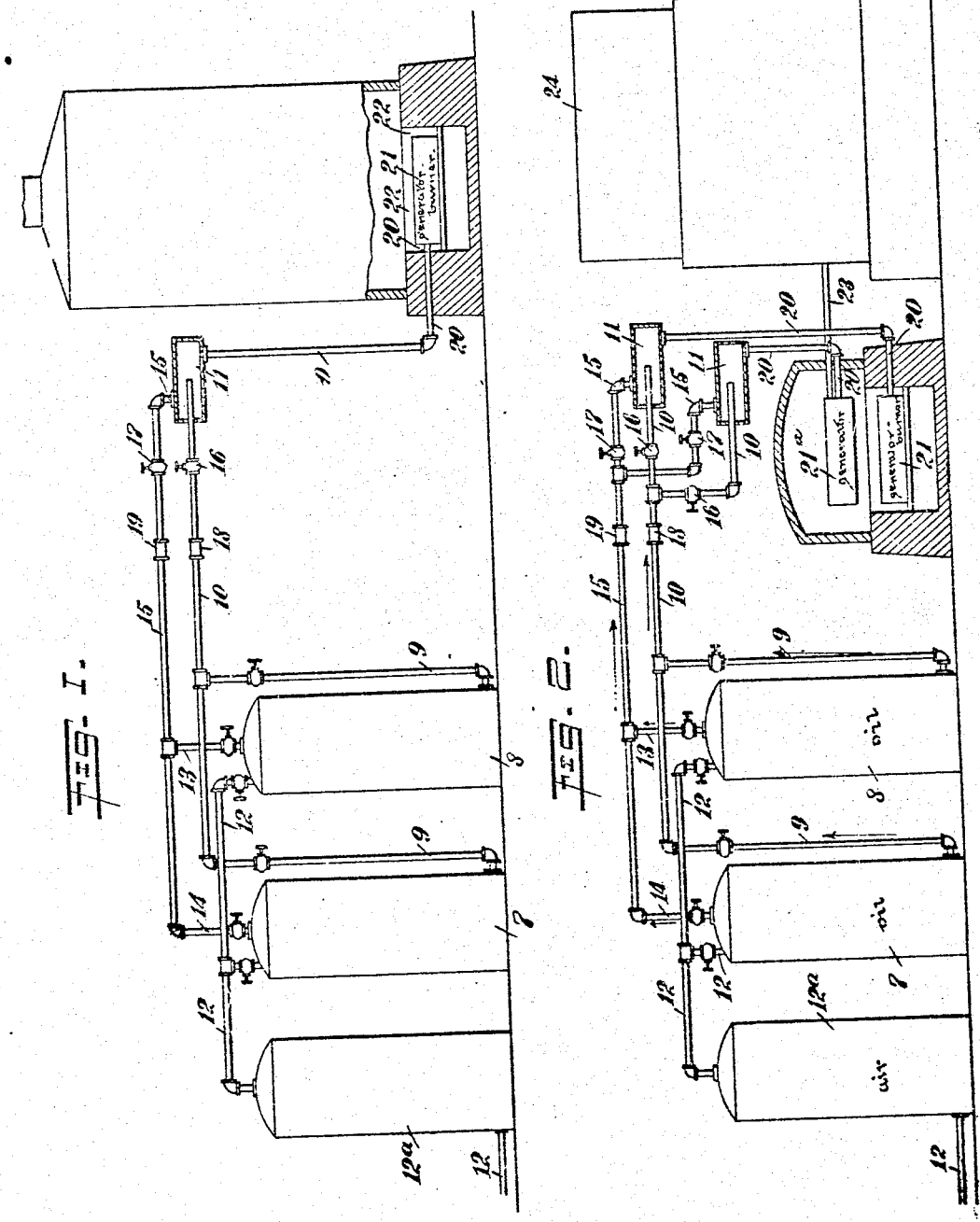

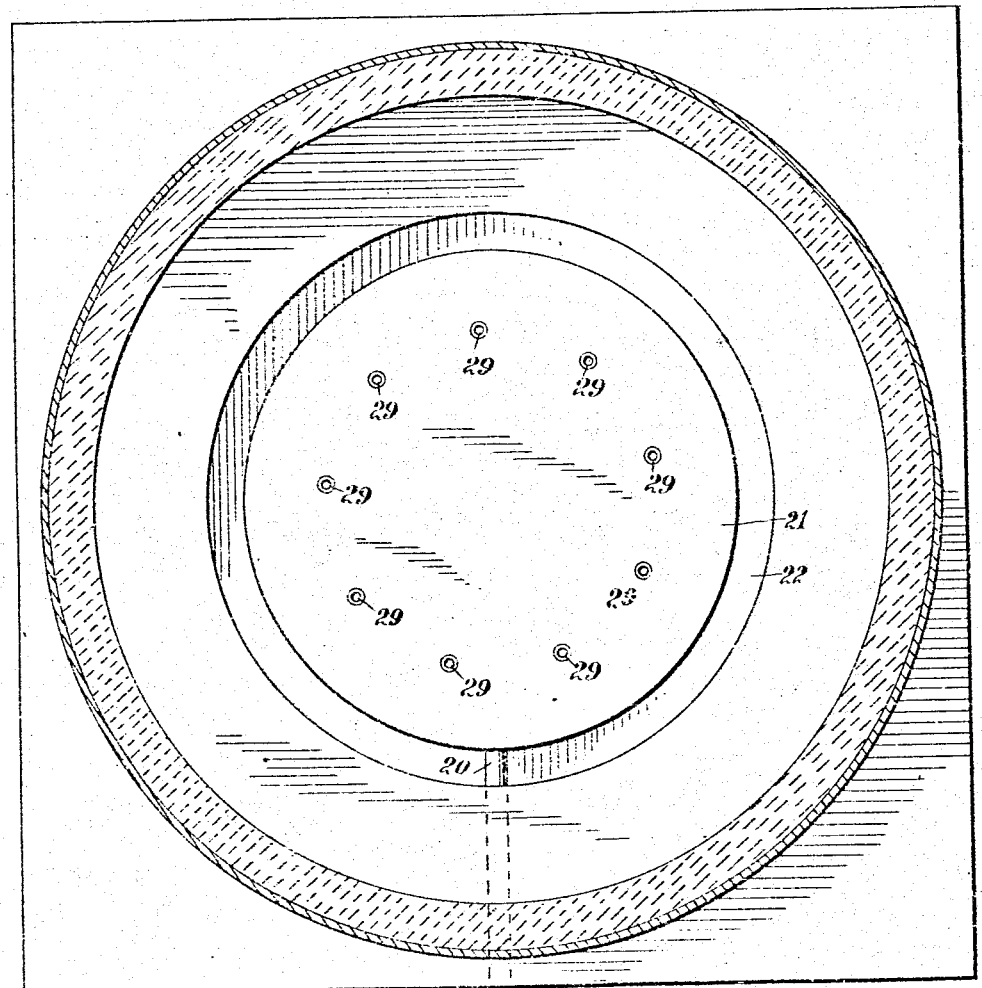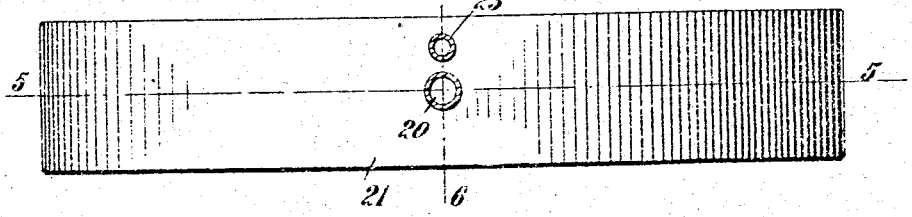

1,013,050.

Patented Dec. 26, 1911.

3 SHEETS—SHEET 3.

INVENTOR
Francis J. Orr
BY
Munn & Co
ATTORNEYS

WITNESSES
G. Robert Thomas
E. H. Murdock

UNITED STATES PATENT OFFICE.

FRANCIS J. ORR, OF BUFFALO, NEW YORK, ASSIGNOR TO PETROLEUM GAS GENERATOR COMPANY, OF PHOENIX, ARIZONA TERRITORY, A CORPORATION OF ARIZONA TERRITORY.

SYSTEM AND APPARATUS FOR GENERATING AND BURNING OIL-GAS.

1,013,050. Specification of Letters Patent. Patented Dec. 26, 1911.

Application filed August 5, 1909, Serial No. 511,231. Renewed June 30, 1911. Serial No. 636,293.

*To all whom it may concern:*

Be it known that I, FRANCIS J. ORR, a citizen of the United States, and a resident of Buffalo, in the county of Erie and State of New York, have invented a new and Improved System and Apparatus for Generating and Burning Oil-Gas, of which the following is a full, clear, and exact description.

Among the principal objects of the present invention are: to provide a construction whereby oil and air in regulated quantities are mechanically mixed beyond the influence of the furnace and delivered under pressure to the burner within the furnace; to provide a construction wherein mechanically mixed oil and air are delivered to an inclosed chamber to be therein baffled in the presence of heat; to provide a burner having a plurality of tortuous passages through which mechanically mixed air and oil are passed in the presence of heat to become fixed as gas, and having suitable orifices for the ejection of gas therefrom; to provide a construction wherein oil and air are delivered to a burner constructed and arranged whereby the suspension of the air pressure causes a cessation of the flow of oil; to provide a fire box construction to contain a burner adapted to consume oil gas and to become heated thereby, and wherein the circulation of atmosphere about the said burner is avoided; and to provide a burner of the construction which is simple, economical, durable and efficient.

One embodiment of the present invention is disclosed in the structure illustrated in the accompanying drawings, in which like characters of reference denote corresponding parts in all the views, and in which—

Figure 5:
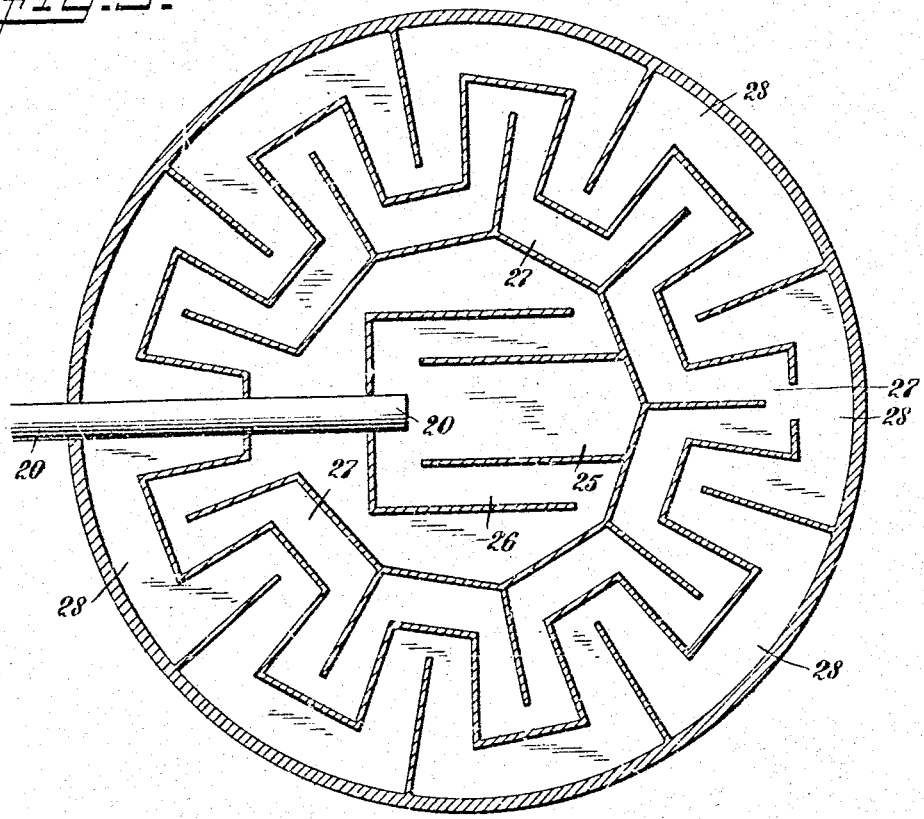
Figure 6:
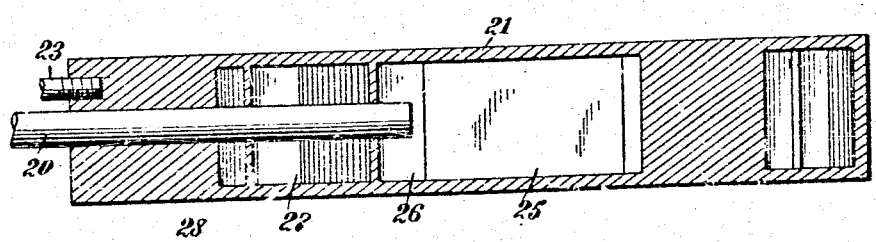

Figure 1 is a side elevation of a system for mixing and feeding oil gas to a suitable burner contained within a furnace; Fig. 2 is a side elevation of a system for generating and storing oil gas; Fig. 3 is a plan view of a burner constructed in accordance with the present invention; Fig. 4 is a side elevation of the burner; Fig. 5 is a horizontal section of the same taken on the line 5—5 in Fig. 4; and Fig. 6 is a vertical section of the burner constructed in accordance with the present invention.

The gas generated is formed from fuel or crude oil. In accordance with the present system this is stored in tanks 7 and 8, from which are extended suitable delivery pipes 9 and 10 which are united and lead into a mixing chamber 11. The pipes 9 and 10 are extended into the tanks 7 and 8 to reach to near the bottom thereof. The oil is raised from said tanks and delivered along the pipes 9 and 10 by means of compressed air, which is delivered into the tanks 7 and 8 from a suitable compressor or storage tank 12ª by a pipe 12. The tanks 7 and 8 are connected by the branches 14 and 13 extended down from an air pipe 15 which is carried to and enters the mixing chamber 11. By this construction it will be seen that the oil and air are delivered to the mixing chamber by the same pressure. Each of the pipes 10 and 15 is provided with a suitable globe valve 16 and 17 whereby the rate of delivery of each of the mediums is regulated. The said pipes are also provided with check valves 18 and 19 adapted to seat against any excessive or uncalculated pressure exerted by the burner on the oil tanks of the system. By the construction thus illustrated it will be seen that the air and oil are delivered to the mixing chamber 11 at the same pressure, and that the quantity delivered is mechanically restricted at the will of the operator without enriching or impoverishing the resultant gas. It will also be seen that should the air pressure at any time become weakened or cease to flow, that the flow of oil will likewise cease as air under pressure is the motive power to raise the oil from the tanks 7 and 8.

The mixing chamber 11 consists in an enlarged pipe section in which the pipe 10 is inserted to deliver the oil lengthwise of the chamber. The pipe 15 enters the said chamber to introduce the air with the stream of injected oil. This action of the air upon the oil immediately breaks up the stream formed of the oil and separates the same into a mist. The rush of air further forms within the chamber 11 a swirling action which continues to mechanically mix the oil and air. By the time the oil and air leave the chamber 11 they have become quite thoroughly mixed. This mixture, it will be observed, is purely mechanical.

Connected with the delivery end of the chamber 11 is a delivery pipe 20 which carries the mixed air and oil to the generator 21. The generator, when used as a burner, is mounted within the fire box of the furnace. This fire box I prefer forming as a pit 22, the sides and bottom of which are closed. By this arrangement the upward draft of the gas generated from the generator 21, together with the natural tendency of heat to rise, carries the surrounding air away from the generator and produces a stagnant or non-circulating medium in immediate contact therewith. This results in the elimination of destructive oxidation of the generator 21.

When the generator 21 is used for making and fixing gas for storage, the construction and arrangement of the system is slightly varied. The variation consists in arranging a generator burner in a fire-box as above described. In the same fire-box, and superimposed above the burner is a second generator $21^a$. The second generator $21^a$ is provided with an outlet pipe 23, and the burning orifices contained in the generator are eliminated. The pipe 23 is carried to a gasometer 24, where the gas is stored.

In the modification wherein the gas is generated for storage purposes, the heat produced in the lower generating burner is received by the upper generator, heating the same sufficiently to produce in it the same transformation as is produced in the lower burner. But instead of the gas being burned at the upper generator it is piped away and stored. When the mixed air and gas is delivered from the chamber 25 it passes therefrom against the incoming flow of air and gas being delivered through the pipe 20. A consequent pressure is produced in the chamber 25 with a resultant expansion of the partly heated mixture when escaping from the said chamber 25. The swirling effect of the incoming air and gas combined with the outward rush of the gases passing from the chamber 25 thoroughly baffles the mixture against the walls of the channels 26. If the wall of the chamber 25 be heated during this baffling or agitation of the mixed gas and air a chemical change or action takes place wherein the gas becomes fixed and can then be stored and used for heat and power. The fixing which is produced by the baffling action in the presence of heat is caused by the gas being forced through the tortuous passages 27 and 28 wherein the character of the elements is changed, and the mixture is transformed from a chemical mixture to a chemical composition. The passages or channels 27 and 28 are formed substantially as shown in the drawings, and consist in a plurality of interposed walls arranged to receive the rushing gases by a succession of impacts, while leaving the same in parallel passages to the burning orifices 29 of the delivery pipe 23. When the generator is used as a burner the orifices 29 are provided, and these are located in the outer passage 28 wherein the gas is received and delivered after having passed from the baffling passages 27—27.

The operation wherein the generator 21 is used as a burner is as follows: A preliminary fire of wood, shavings or other suitable material is ignited on the upper surface around and below the generator 21 and continued for a sufficient length of time to heat the generator or the outer surface thereof. A small quantity of oil having been run into the generator the valves 16 and 17 are then operated to admit the oil and air under pressure to the mixing chamber 11, and to force the same therefrom through the inlet pipe 20 into the generator 21. Here the mechanically mixed air and oil is forced through the mixing chamber 25, passages 26—26 and the tortuous passage 27, being baffled constantly until reaching the passages 28—28 through which it is forced, continuing the same baffling action until ejected from the orifices 29—29. As above stated, the air and oil have been transformed into hydrocarbon gas of intense heat-producing quality. The heat generated by the preliminary fire expands and reacts upon the air and oil to form this gas, the pressure whereof, on being ejected from the orifices 29—29 augments the intensity of the flame. This heat reacts upon the generator 21 to heat the same. The heat transferred to the generator 21 is such that in usual practice the metal of the same is brought to a cherry red. At this temperature it is maintained by controlling the amount of oil and air delivered to the mixing chamber 11, this mixture being controlled by the valves 16 and 17.

In conclusion, I desire to emphasize that the principal mechanical feature employed in this system is: a chamber having a tortuous passage leading from the inlet to the outlet, the walls of said passage being a series of vertical planes, more or less even, set at varying angles to each other, and closed at top and bottom so as to impede the flow of the mixture of oil and air as it is heated, baffling and mixing each on its onward rush in its heating condition, retaining it while a mechanical action takes place, breaking up the oil (by burning a part of its carbon giving us $CO_2$ and $CO$) and combining it with the air to form a fixed oil-gas when properly controlled by the regulating valves.

Having thus described my invention, what I claim as new and desire to secure by Letters Patent is:—

1. A system for generating and burning oil gas, comprising an oil storage tank, a mixing chamber removed from the burner beyond the heating influence thereof, an oil delivery pipe forming communication between said tank and said chamber, a hollow metal generator and burner having a plurality of burner orifices and a tortuous passage leading from the supply pipe to said orifices, a pipe communicating between said mixing chamber and said burner, and a compressed air system in open communication with said chamber and said tank adapted to deliver the oil therefrom by pressure.

2. A system for generating and storing oil gas, comprising an oil storage tank, a mixing chamber removed from the burner beyond the heating influence thereof, an oil delivery pipe forming communication between said tank and said chamber, a hollow metal generator and burner having a tortuous passage leading from the inlet to the outlet adapted to baffle the mixed oil and air to form fixed gas, a gasometer adapted to receive the gas from the said generator, a pipe communicating between said generating chamber and said mixing chamber, a pipe communicating between said generator and said gasometer, and a compressed air system in open communication with said chamber and said tank adapted to deliver the oil therefrom by pressure.

3. A system for generating and burning oil gas, comprising an oil storage tank, a mixing chamber removed from the burner beyond the heating influence thereof, an oil delivery pipe forming communication between said tank and said chamber and extended above said tank to cause the oil to flow backward when not under pressure, a hollow metal generator and burner having a plurality of burner orifices and a tortuous passage leading from the supply pipe to said orifices, a pipe communicating between said mixing chamber and said burner, and a compressed air system in open communication with said chamber and said tank adapted to deliver the oil therefrom by pressure.

4. A system for generating and burning oil gas, comprising an oil storage tank, a mixing chamber removed from the burner beyond the heating influence thereof, an oil delivery pipe forming communication between said tank and said chamber, a hollow generating chamber having an inlet pipe extended to near the center thereof and an open ended chamber to receive said pipe, and provided with a series of burning orifices and baffling passages leading from said open ended chamber thereto, a pipe communicating between said mixing chamber and said hollow generating chamber, and a compressed air system in open communication with said chamber adapted to deliver the oil therefrom by pressure.

5. A system for generating and burning oil gas, comprising an oil storage tank, a mixing chamber removed from the burner beyond the heating influence thereof, an oil delivery pipe forming communication between said tank and said chamber, a hollow generating chamber having an inlet pipe extended to near the center thereof and an open ended chamber to receive said pipe, and provided with a series of burner orifices and baffling passages leading from said open ended chamber thereto, a pipe communicating between said mixing chamber and said hollow generating chamber, a compressed air system in open communication with said chamber adapted to deliver the oil therefrom by pressure, and a pit to receive said generating chamber formed in the fire box of the furnace and having solid side walls and bottom to prevent the circulation of air about the outside of said chamber.

6. A system for generating and burning oil gas, comprising an oil storage tank, a mixing chamber removed from the burner beyond the heating influence thereof, an oil delivery pipe forming communication between said tank and said chamber, a hollow metal generator and burner having a plurality of burner orifices and a tortuous passage leading from the supply pipe to said orifices, a pipe communicating between said mixing chamber and said burner, said pipe being unreduced at the delivery end, a pipe communicating between said mixing chamber and said burner, and a compressed air system in open communication with said chamber and said tank adapted to deliver the oil therefrom by pressure.

7. A system for generating and burning oil gas, comprising an oil delivery system, a compressed air system, a mixing chamber adapted to receive both the said oil and air delivered by their respective systems, and a generating burner consisting in a hollow metal generator and burner provided with a series of baffling passages and burner orifices, said chamber being adapted to become heated, and a pipe in open communication between said mixing chamber and said hollow metal generator and burner of sufficient length to remove said mixing chamber from the heat of said burner.

8. A system for generating and burning oil gas comprising an oil storage tank; a compressed air system for delivering the oil from said tank; a mixing chamber adapted to receive said oil and said compressed air in a manner to become mixed therein; a generator removed from said mixing chamber and in open communication therewith by means of a delivery pipe adapted to deliver the mechanically mixed air and oil; an outlet pipe leading from said generator; a gas storage tank to receive the gas generated from said delivery pipe; baffling walls mounted in said generator interposed between the inlet and outlet pipes thereof; a gas heater disposed below said generator to heat the same; and a receptacle for said heater having totally closed bottom and sides, said sides being extended above the top of said burner.

9. A system for generating and burning oil gas comprising a mixing chamber; means for delivering oil and air into said chamber under pressure; a gas generator connecting with said mixing chamber and having an inlet and outlet pipe; a storage tank adapted to receive gas as generated from said generator; a burner connected with said chamber and supplied therefrom; and a receptacle for said burner having closed bottom and sides, said sides extending above said burner.

In testimony whereof I have signed my name to this specification in the presence of two subscribing witnesses.

FRANCIS J. ORR.

Witnesses:
E. F. MURDOCK,
PHILIP D. ROLLHAUS.